US012140067B2

(12) United States Patent
Zhou et al.

(10) Patent No.: US 12,140,067 B2
(45) Date of Patent: Nov. 12, 2024

(54) CYLINDER HEAD WATER JACKET DESIGN

(71) Applicant: CUMMINS INC., Columbus, IN (US)

(72) Inventors: Xiling Zhou, Hubei Province (CN); Darrin Ferry, Columbus, IN (US); Vijaysai Karuppiah Kumareshan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/383,770

(22) Filed: Oct. 25, 2023

(65) Prior Publication Data

US 2024/0141818 A1 May 2, 2024

(51) Int. Cl.
*F01P 3/02* (2006.01)
*F02F 1/40* (2006.01)

(52) U.S. Cl.
CPC .................. *F01P 3/02* (2013.01); *F02F 1/40* (2013.01); *F01P 2003/024* (2013.01)

(58) Field of Classification Search
CPC ........... F01P 3/02; F01P 2003/024; F02F 1/40
See application file for complete search history.

(56) References Cited

U.S. PATENT DOCUMENTS 8,776,735 B2 * 7/2014 Kosugi ..................... F02F 1/40 123/41.82 R
9,574,492 B2 * 2/2017 Owens .................... C25B 15/08
9,732,661 B2 * 8/2017 Jones ........................ F01P 7/14
10,184,420 B2 1/2019 Tempesta et al.
10,323,601 B2 6/2019 Zahdeh et al.
10,876,462 B1 12/2020 Draisey et al.
2004/0068987 A1 * 4/2004 Matsuoka .............. F02M 33/00 60/649
2010/0012090 A1 * 1/2010 Lewis, III ............... F02B 43/10 123/3

(Continued)

FOREIGN PATENT DOCUMENTS

CN 205744173 U 11/2016
EP 3 623 596 A1 3/2020

(Continued)

OTHER PUBLICATIONS

Search Report for EP Application No. 23203169.0, dated Mar. 19, 2024.

*Primary Examiner* — Syed O Hasan
(74) *Attorney, Agent, or Firm* — Foley & Lardner LLP

(57) ABSTRACT

The application relates to cylinder head water jacket design. A water jacket for a cylinder head of an engine system includes a water jacket lower portion including a plurality of water jacket lower portion coolant inlets and a plurality of water jacket lower portion coolant paths. The water jacket lower portion is in coolant receiving communication with the water jacket lower portion coolant inlets. The water jacket further includes a water jacket upper portion connected to and in coolant receiving communication with the water jacket lower portion. The water jacket upper portion includes a first coolant rail, a second coolant rail, and a water jacket upper portion coolant outlet. A first one of the plurality of water jacket lower portion coolant paths surrounds at least a portion of an exhaust port of the cylinder head. A second one of the plurality of water jacket lower portion coolant paths is positioned between two intake ports of the cylinder head.

19 Claims, 8 Drawing Sheets

(56) References Cited

U.S. PATENT DOCUMENTS

| | | | | |
|---|---|---|---|---|
| 2011/0277708 | A1* | 11/2011 | Geiser | F02F 1/40 123/41.82 R |
| 2012/0132155 | A1 | 5/2012 | Smith et al. | |
| 2017/0067413 | A1* | 3/2017 | Maki | B22D 17/00 |
| 2017/0268455 | A1 | 9/2017 | Yang | |
| 2018/0106213 | A1 | 4/2018 | Knollmayr | |

FOREIGN PATENT DOCUMENTS

| | | | |
|---|---|---|---|
| GB | 2 536 030 | A | 9/2016 |
| JP | 4108868 | B2 * | 6/2008 |
| JP | 2010-031689 | A | 2/2010 |
| KR | 20090052082 | A | 5/2009 |
| WO | WO-2011/163633 | A2 | 12/2011 |

* cited by examiner

CYLINDER HEAD WATER JACKET DESIGN

CROSS-REFERENCE TO RELATED APPLICATIONS

This application claims priority to and the benefit of Chinese Patent Application No. 202211328895.2, filed Oct. 27, 2022, the content of which is incorporated herein by reference.

TECHNICAL FIELD

The present disclosure relates generally to cylinder head water jacket designs for use in engine systems.

BACKGROUND

In an engine system, it is desirable to provide cooling because of the high temperatures generated within the engine system during operation and in particular to provide cooling at the cylinder head. One approach that can be implemented to provide such cooling is to include a water jacket in the cylinder head that allows a coolant to flow through the cylinder head. However, the effectiveness of the cooling can depend significantly on the design of the water jacket.

SUMMARY

In various embodiments, a water jacket for a cylinder head of an engine system includes a water jacket lower portion including a plurality of water jacket lower portion coolant inlets and a plurality of water jacket lower portion coolant paths. The water jacket lower portion is in coolant receiving communication with the plurality of water jacket lower portion coolant inlets. The water jacket further includes a water jacket upper portion connected to and in coolant receiving communication with the water jacket lower portion. The water jacket upper portion includes a first coolant rail, a second coolant rail, and a water jacket upper portion coolant outlet. A first one of the plurality of water jacket lower portion coolant paths surrounds at least a portion of an exhaust port of the cylinder head and a second one of the plurality of water jacket lower portion coolant paths is positioned between two intake ports of the cylinder head.

In some embodiments, the water jacket lower portion comprises two water jacket lower portion coolant inlets for each cylinder defined by an engine block connected to the cylinder head.

In some embodiments, a first one of the water jacket lower portion coolant inlets is positioned on an intake side of the water jacket lower portion and a second one of the water jacket lower portion coolant inlets is positioned on an exhaust side of the water jacket lower portion.

In some embodiments, the second one of the plurality of water jacket lower portion coolant paths is in coolant receiving communication with the first one of the plurality of water jacket lower portion coolant paths.

In some embodiments, the first coolant rail is positioned on an intake side of the water jacket upper portion and the second coolant rail is positioned on an exhaust side of the water jacket upper portion.

In some embodiments, a length of each of the first coolant rail and the second coolant rail is the same as a length of the water jacket upper portion.

In some embodiments, the water jacket lower portion comprises a water jacket lower portion coolant outlet.

In some embodiments, the water jacket upper portion is in coolant receiving communication with the first one of the plurality of water jacket lower portion coolant paths.

In some embodiments, the water jacket upper portion comprises at least one water jacket upper portion coolant path connecting the first coolant rail to the second coolant rail.

In some embodiments, the water jacket lower portion comprises a plurality of pads forming a seal between the water jacket lower portion and the cylinder head.

In some embodiments, the water jacket lower portion comprises a water jacket lower portion oil inlet that is in oil receiving communication with an oil supply of the engine system.

In some embodiments, the first one of the plurality of water jacket lower portion coolant paths comprises at least one segment configured to allow the coolant first to flow toward an intake side of the water jacket lower portion before flowing back toward an exhaust side of the water jacket lower portion.

In some embodiments, the second one of the plurality of water jacket lower portion coolant paths comprises at least one segment configured to allow the coolant to flow toward an intake side of the water jacket lower portion.

In some embodiments, the water jacket lower portion comprises a third one of the plurality of water jacket lower portion coolant paths, the third one of the plurality of water jacket lower portion coolant paths surrounding at least a portion of a first one of the two intake ports.

In some embodiments, the third one of the plurality of water jacket lower portion coolant paths comprises at least one segment configured to allow the coolant to flow toward an exhaust side of the water jacket lower portion.

In some embodiments, the water jacket upper portion coolant outlet is positioned on an exhaust side of the water jacket upper portion.

In some embodiments, an engine system comprises: an engine block defining at least one cylinder; and a cylinder head connected to the engine block, the cylinder head comprising the water jacket described above.

In some embodiments, the cylinder head comprises a plurality of ribs forming a seal between the water jacket lower portion and the cylinder head.

DESCRIPTION OF THE DRAWINGS

The disclosure will become more fully understood from the following detailed description, taken in conjunction with the accompanying figures, wherein like reference numerals refer to like elements, in which.

Figure 1:
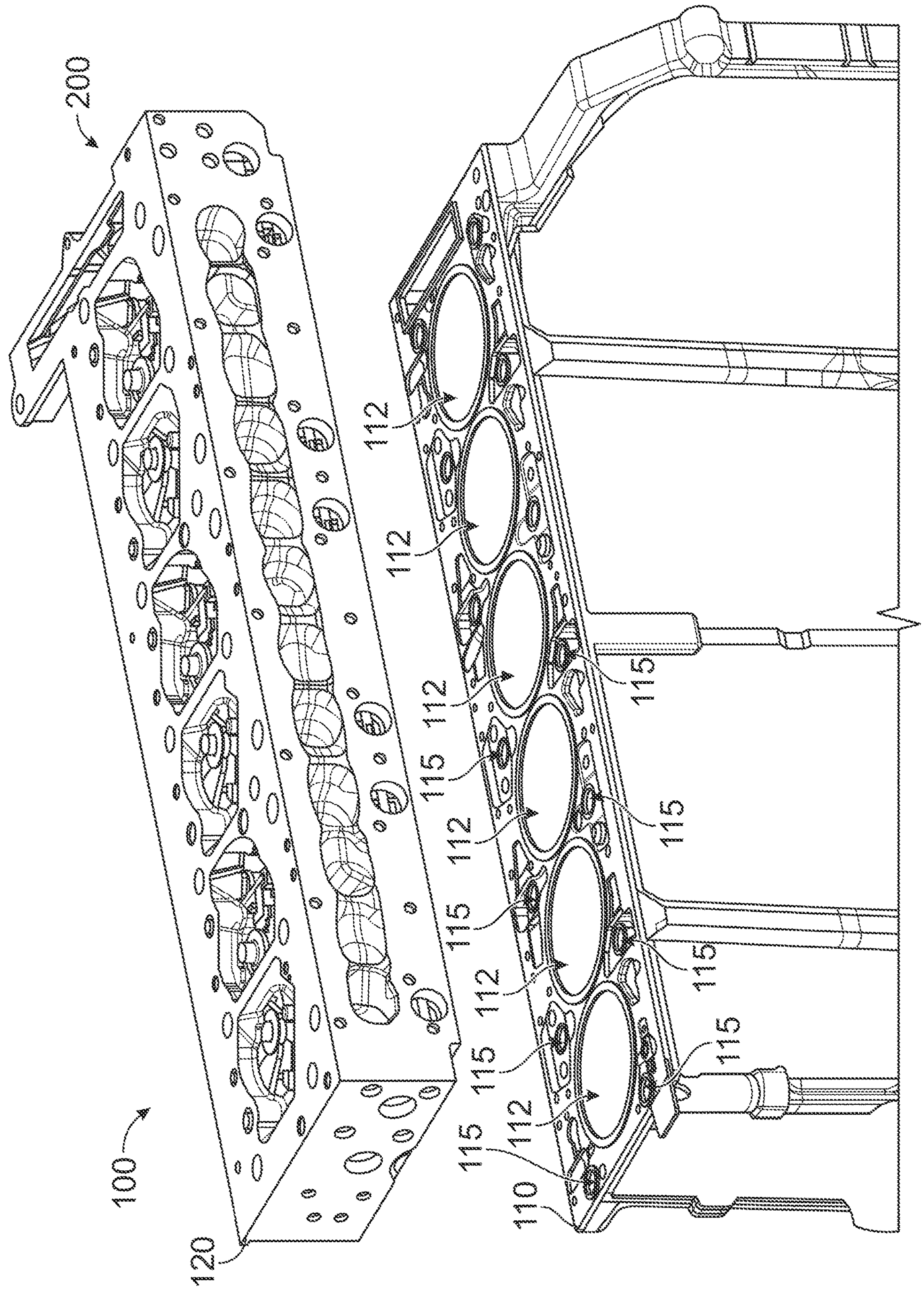
FIG. 1 is a top perspective view of an engine system according to one embodiment.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION OF EMBODIMENTS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Implementations herein relate to a water jacket having a water jacket lower portion and a water jacket upper portion. The water jacket upper portion is connected to the water jacket lower portion. The water jacket lower portion has a water jacket lower portion first coolant path surrounding at least a portion of an exhaust port of a cylinder head and has a water jacket lower portion second coolant path positioned between two intake ports of the cylinder head, and the water jacket upper portion has a first coolant rail and a second coolant rail. When coolant is provided to the water jacket, the flow of the coolant through the water jacket cools components of the engine system that the water jacket is in contact with, including the exhaust port and the intake ports. Further, the volume of the first and second coolant rails and the multiple connections between the water jacket upper portion and the water jacket lower portion allow for reduced resistance in the water jacket. In this way, the water jacket may provide a benefit of cooling components of the engine system while meeting lower pressure drop and thermal requirements. Providing a lower pressure drop in the water jacket can allow for minimizing pump power loss, which provides a fuel economy benefit, and for obtaining a 0.1% brake thermal efficiency (BTE) benefit in particular embodiments.

FIG. 1 depicts a top perspective view of an engine system 100, according to an example embodiment. The engine system 100 may include any suitable internal combustion engine (e.g., four-cylinder engines, six-cylinder engines, etc.).

Figure 8:
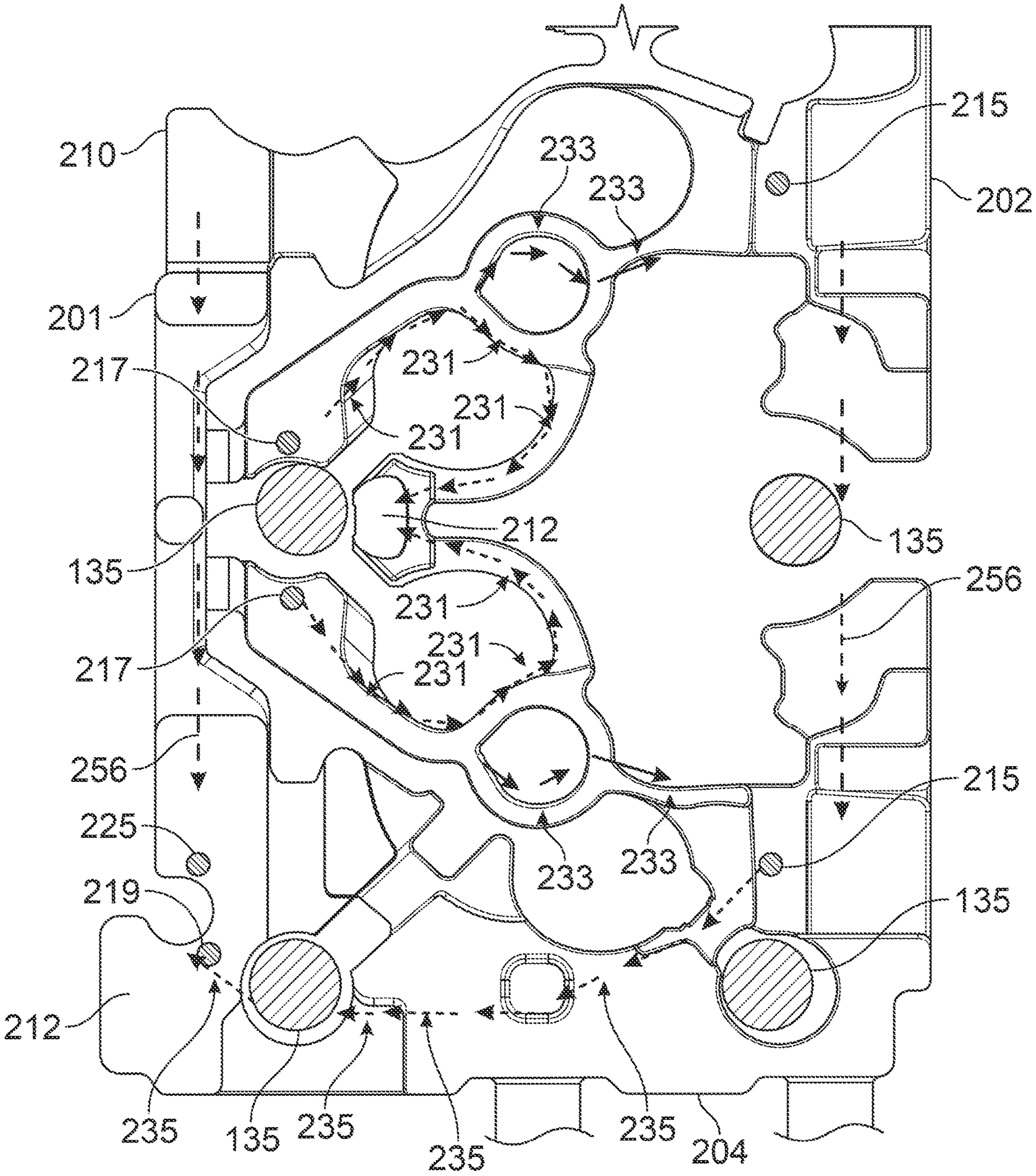
FIG. 8 is a top view of a part of the water jacket lower portion of the water jacket of FIG. 3, showing the flow of coolant through the water jacket lower portion.

The engine system 100 includes an engine block 110. The engine block 110 defines a plurality of cylinders 112. Each cylinder 112 is configured to receive a piston that can move reciprocally within the cylinder 112. In the embodiment of FIG. 1, the engine block 110 defines six cylinders 112. In other embodiments, the engine block 110 may define more or fewer cylinders. The engine block 110 defines a plurality of engine block bolt holes 115 and each engine block bolt hole 115 is configured to receive a bolt 135, as shown in FIG. 8. The engine block 110 defines the plurality of engine block bolt holes 115 such that each cylinder 112 is surrounded by four engine block bolt holes 115. In the embodiment of FIG. 1, each cylinder 112 is surrounded by four engine block bolt holes 115 such that the total number of engine block bolt holes 115 is equal to two plus two times the number of cylinders 112. In other embodiments, each cylinder 112 may be surrounded by four engine block bolt holes 115 such that the total number of engine block bolt holes 115 is equal to four times the number of cylinders 112.

Figure 2:
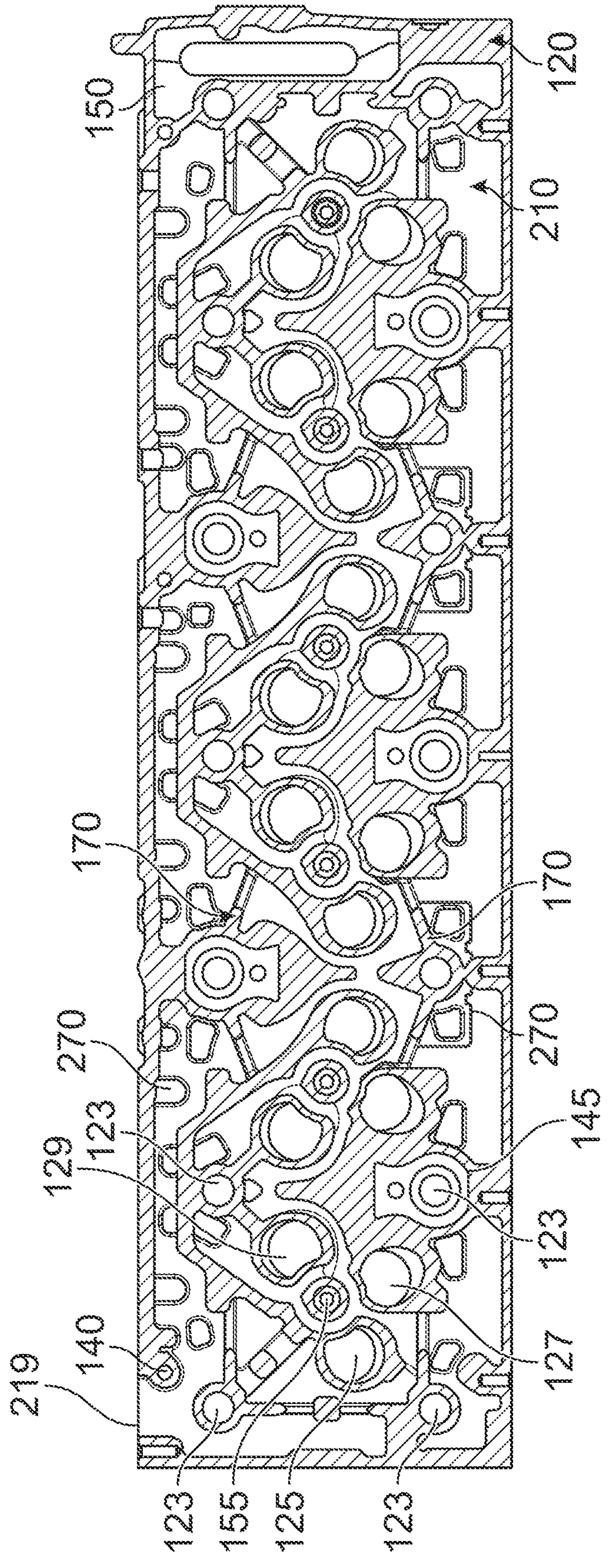
FIG. 2 is a top cross-sectional view of a water jacket lower portion and a cylinder head of the engine system of FIG. 1.
Figure 3:
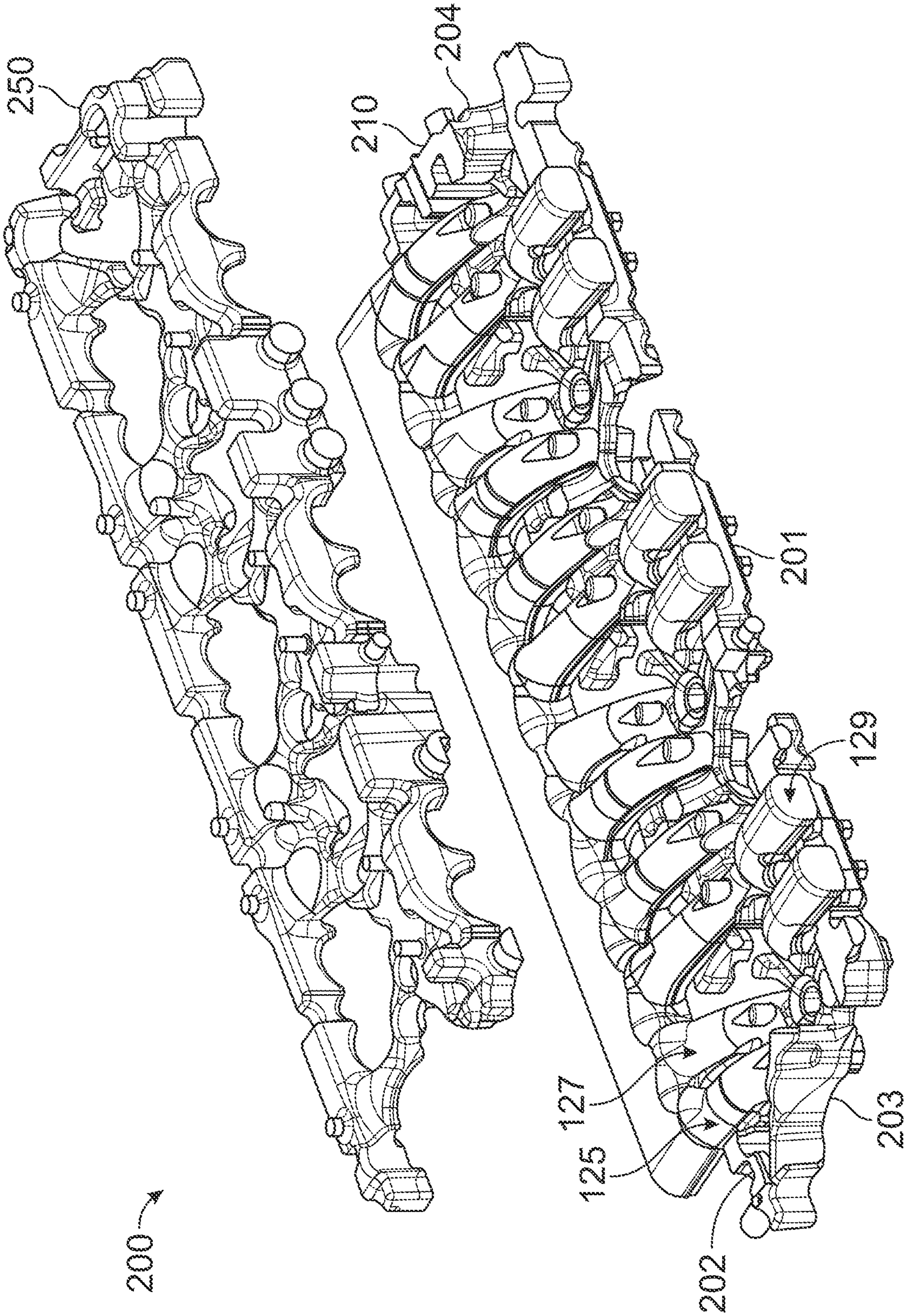
FIG. 3 is a top perspective view of a water jacket upper portion and the water jacket lower portion of a water jacket of the engine system of FIG. 1, and showing intake ports and exhaust ports of the engine system.

FIG. 2 depicts a top cross-sectional view of a cylinder head 120 of the engine system of FIG. 1. The cylinder head 120 is connected to the engine block 110. As shown in FIGS. 2 and 3, the cylinder head 120 includes a first intake port 125, a second intake port 127, and an exhaust port 129. Each of the first intake port 125, the second intake port 127, and the exhaust port 129 corresponds to a valve such that the engine system 100 has three valves for each cylinder 112.

Referring again to FIG. 2, the cylinder head 120 defines a gear receptacle 150 configured to receive a cam gear. The cylinder head 120 defines at least one cylinder head oil inlet 140 that is in oil receiving communication with an oil supply of the engine system 100. The cylinder head 120 defines at least one oil drain bore 145 that is in oil receiving communication with the at least one cylinder head oil inlet 140 and that allows the oil to exit from the cylinder head 120. The cylinder head 120 defines at least one injector bore 155 configured to receive an injector. The cylinder head 120 includes a plurality of ribs 170. The plurality of ribs 170 form a seal between the water jacket lower portion 210 and the cylinder head 120, and so the plurality of ribs 170 support proper gasket function of an engine system 100 and reduce head lift of the cylinder head 120.

The cylinder head 120 defines a plurality of cylinder head bolt holes 123 and each cylinder head bolt hole 123 is configured to receive a bolt 135, as shown in FIG. 8. The cylinder head 120 defines a same number of cylinder head bolt holes 123 as the engine block 110 defines the number of engine block bolt holes 115. Each of the cylinder head bolt holes 123 is configured to be contiguous with one of the engine block bolt holes 115 to allow a respective bolt 135 to be positioned in both the cylinder head bolt hole 123 and the engine block bolt hole 115. The cylinder head 120 is connected to the engine block 110 via the plurality of bolts 135 that the plurality of engine block bolt holes 115 and the plurality of cylinder head bolt holes 123 are configured to receive.

FIGS. 3, 4, 6, and 7 depict top perspective views of the water jacket 200 of the cylinder head 120. The water jacket 200, as compared to water jackets of other models for four-bolt, three-valve engine systems, has a larger volume that allows for a weight reduction of 2.5 kg of the engine system 100. The water jacket 200 may be made of cast iron or any other suitable material.

The water jacket 200 allows for coolant to flow through the water jacket 200 and to cool components of the engine system 100 that are in contact with the water jacket 200. As shown in FIG. 3, the water jacket 200 includes an exhaust port 129 at or adjacent an exhaust side 201, which is a first side of the water jacket 200. The water jacket 200 also includes a first intake port 125 and a second intake port 127 at or adjacent an intake side 202, which is a second side of the water jacket 200. The exhaust side 201 is opposite the intake side 202. The water jacket 200 has a third side 203 and a fourth side 204, each of which is positioned between the intake side 202 and the exhaust side 201.

Figure 4:
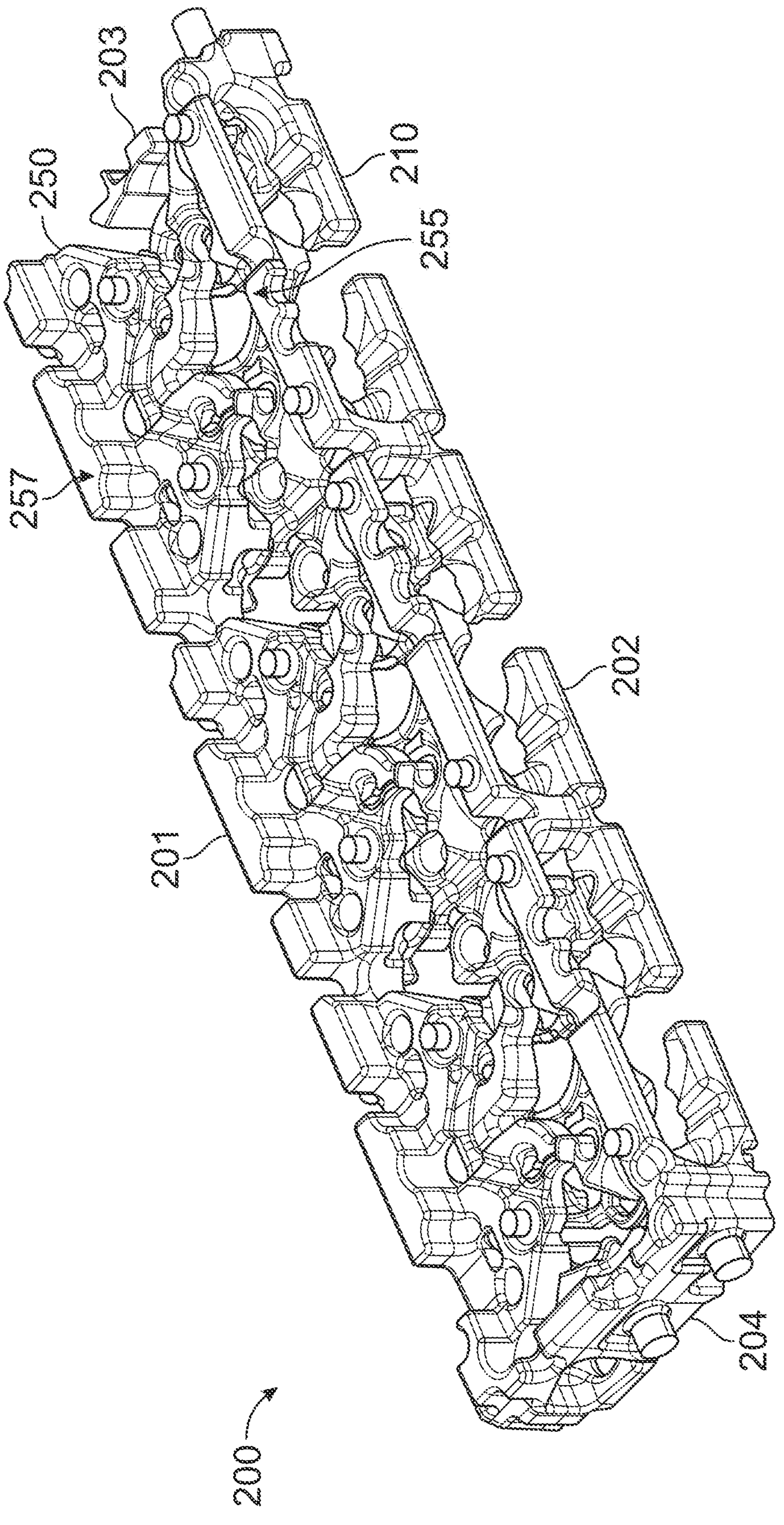
FIG. 4 is a top perspective view of the water jacket of FIG. 3.

As shown in FIG. 4, the water jacket 200 includes a water jacket upper portion 250 connected to and in coolant receiving communication with a water jacket lower portion 210. The coolant may be any suitable coolant (e.g., water, oil, etc.). The water jacket upper portion 250 is positioned above the water jacket lower portion 210. The water jacket lower portion 210 is positioned below the water jacket upper portion 250 and above the engine block 110.

The water jacket upper portion 250 includes a first coolant rail 255 and a second coolant rail 257 positioned on opposite sides of the water jacket upper portion 250. As shown in FIG. 4, the first coolant rail 255 is positioned on the intake side 202 and the second coolant rail 257 is positioned on the exhaust side 201. As shown in FIG. 4, the first coolant rail 255 and the second coolant rail 257 are positioned such that a longitudinal axis of each of the first coolant rail 255 and the second coolant rail 257 is parallel to the row of the plurality of cylinders 112 defined by the engine block 110. As shown in FIG. 4, a length of each of the first coolant rail 255 and the second coolant rail 257 is the same as the length of the water jacket upper portion 250 from the third side 203 to the fourth side 204. The first coolant rail 255 and the second coolant rail 257 of the water jacket upper portion 250 allow for a reduction in weight of the engine system 100 and to lower pressure drop across the water jacket 200.

Figure 7:
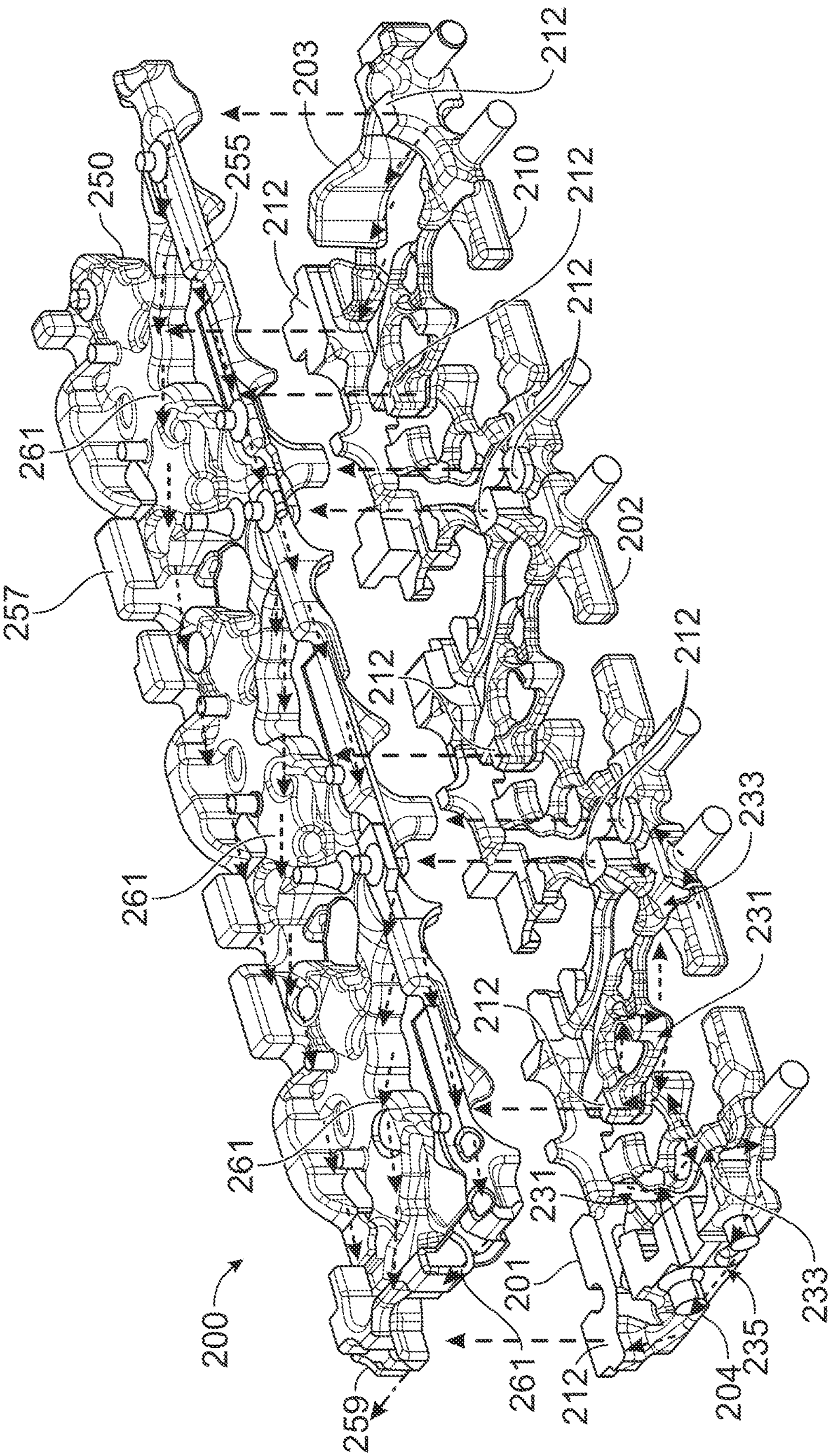
FIG. 7 is another top perspective view of the water jacket of FIG. 3, showing the flow of coolant through the water jacket.

As shown in FIG. 7, the water jacket upper portion 250 includes at least one water jacket upper portion coolant path 261 connecting the first coolant rail 255 to the second coolant rail 257. As shown in FIG. 7, the water jacket upper portion 250 includes four water jacket upper portion coolant paths 261. In other embodiments, the water jacket upper portion 250 may include more or fewer water jacket upper portion coolant paths 261.

Figure 5:
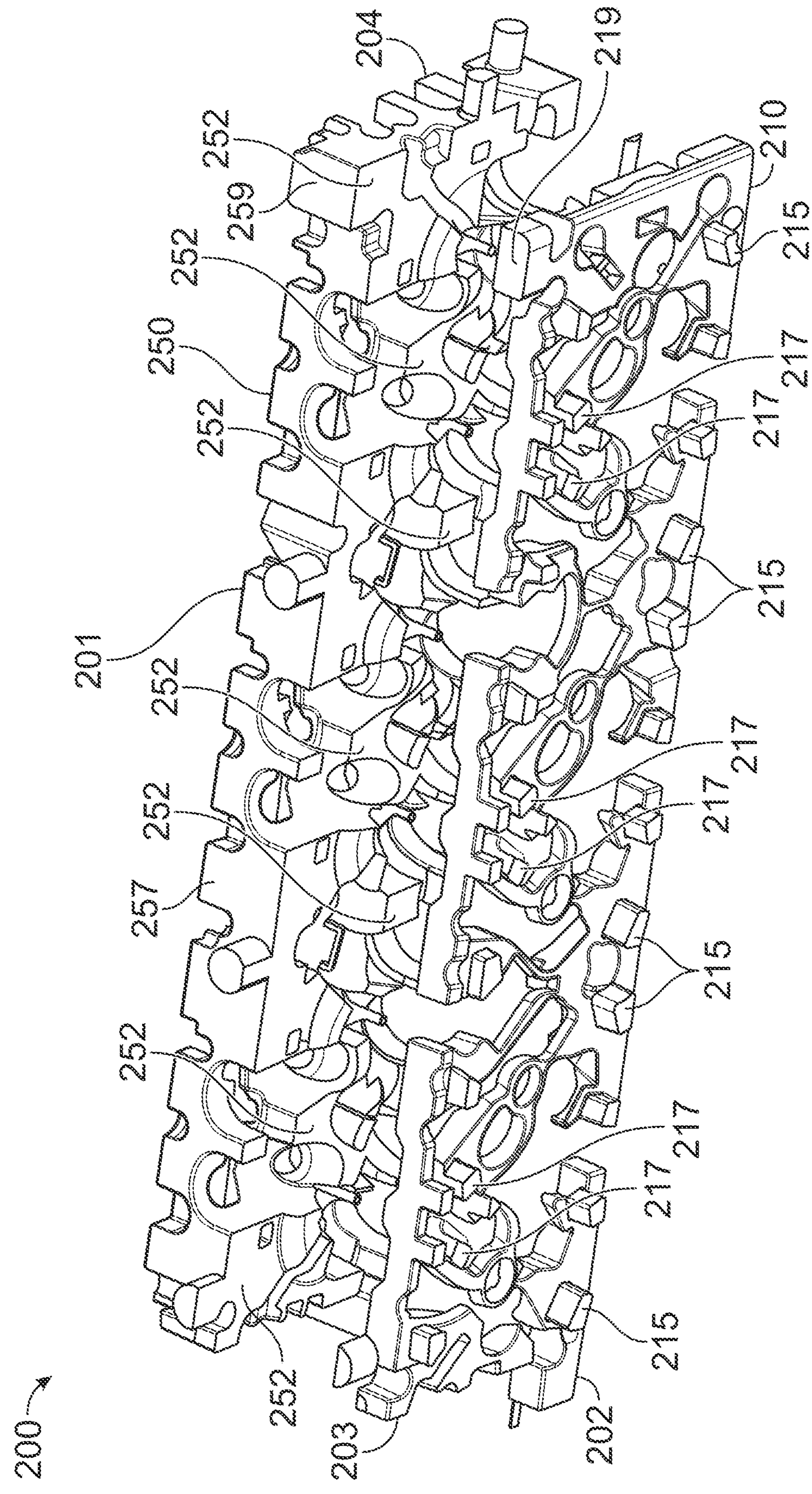
FIG. 5 is a bottom perspective view of the water jacket of FIG. 3.

FIG. 5 is a bottom perspective view of the water jacket 200. The water jacket upper portion 250 includes a water jacket upper portion coolant outlet 259. As shown in FIG. 5, the water jacket upper portion coolant outlet 259 is located at a corner of the water jacket upper portion 250 on the exhaust side 201 and the fourth side 204. In other embodiments, the water jacket upper portion coolant outlet 259 may be positioned at another corner of the water jacket upper portion 250 or at another location of the water jacket upper portion 250. As shown in FIG. 5, the water jacket upper portion 250 includes one water jacket upper portion coolant outlet 259. In other embodiments, the water jacket upper portion 250 may include multiple water jacket upper portion coolant outlets 259.

Referring again to FIG. 7, the flow of the coolant through the first coolant rail 255, the second coolant rail 257, and the at least one water jacket upper portion coolant path 261 is shown to flow from the third side 203 to the fourth side 204 and from the intake side 202 to the exhaust side 201, toward the water jacket upper portion coolant outlet 259. In other embodiments, the flow of the coolant through the first coolant rail 255, the second coolant rail 257, and the at least one water jacket upper portion coolant path 261 may flow from the fourth side 204 to the third side 203 and/or from the exhaust side 201 to the intake side 202.

Referring again to FIG. 5, the water jacket upper portion 250 includes at least one water jacket upper portion connection 252. Each water jacket upper portion connection 252 is configured to contact and be in coolant receiving communication with a corresponding water jacket lower portion connection 212 of the water jacket lower portion 210. As shown in FIG. 5, a plurality of water jacket upper portion connections 252 is positioned on the water jacket upper portion 250. The water jacket upper portion connections 252 may be positioned at the intake side 202, the exhaust side 201, and/or in between the intake side 202 and the exhaust side 201. The multiple connections between the water jacket upper portion 250 and the water jacket lower portion 210 formed by the contacting of the plurality of water jacket upper portion connections 252 and the plurality of water jacket lower portion connections 212 allow for a lower pressure drop in the water jacket 200.

As shown in FIG. 5, the water jacket lower portion 210 is connected to and in coolant providing communication with the water jacket upper portion 250. The water jacket lower portion 210 includes a plurality of water jacket lower portion first coolant inlets 215 and a plurality of water jacket lower portion second coolant inlets 217. The water jacket lower portion 210 is in coolant receiving communication with the plurality of water jacket lower portion first coolant inlets 215 and the plurality of water jacket lower portion second coolant inlets 217. As shown in FIG. 5, a water jacket lower portion first coolant inlet 215 is positioned on the intake side 202 of the water jacket lower portion 210 and a water jacket lower portion second coolant inlet 217 is positioned on the exhaust side 201 of the water jacket lower portion 210. In other embodiments, the water jacket lower portion first coolant inlet 215 and the water jacket lower portion second coolant inlet 217 may be positioned at other locations of the water jacket lower portion 210.

As shown in FIG. 5, the water jacket lower portion 210 has two water jacket lower portion coolant inlets (the water jacket lower portion first coolant inlet 215 and the water jacket lower portion second coolant inlet 217) for each cylinder 112 defined by the engine block 110 for a total of twelve water jacket lower portion coolant inlets (six water jacket lower portion first coolant inlets 215 and six water jacket lower portion second coolant inlets 217). In other embodiments, the water jacket lower portion 210 may have fewer or more of each of the water jacket lower portion first coolant inlets 215 and the water jacket lower portion second coolant inlets 217. As shown in FIG. 5, the water jacket lower portion 210 has a same number of water jacket lower portion first coolant inlets 215 as a number of water jacket lower portion second coolant inlets 217. In other embodiments, the water jacket lower portion 210 may have a different number of water jacket lower portion first coolant inlets 215 as the number of water jacket lower portion second coolant inlets 217.

As shown in FIG. 8, the water jacket lower portion 210 may include a water jacket lower portion oil inlet 225 that is in oil receiving communication with an oil supply of the engine system 100. As shown in FIG. 8, the water jacket lower portion oil inlet 225 is positioned on the exhaust side 201 of the water jacket lower portion 210.

Figure 6:
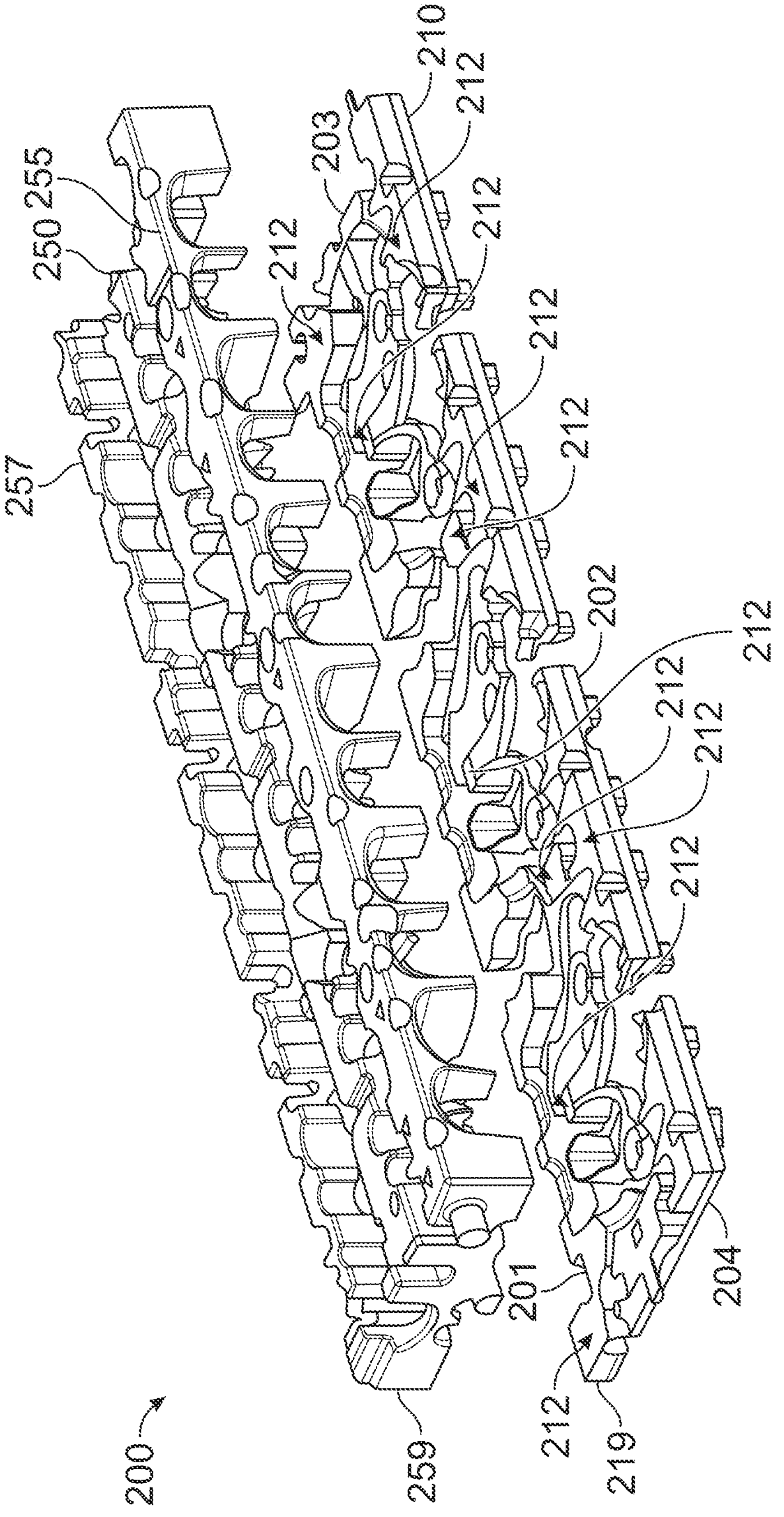
FIG. 6 is another top perspective view of the water jacket of FIG. 3.

Referring again to FIGS. 5 and 6, the water jacket lower portion 210 may include a water jacket lower portion coolant outlet 219. As shown in FIGS. 5 and 6, the water jacket lower portion coolant outlet 219 is positioned at the corner of the water jacket lower portion 210 at the exhaust side 201 and the fourth side 204. In other embodiments, the water jacket lower portion coolant outlet 219 may be positioned at another corner of the water jacket lower portion 210 or at another location of the water jacket lower portion 210. In embodiments without the water jacket lower portion coolant outlet 219, all coolant that enters the water jacket lower portion 210 then enters the water jacket upper portion 250. In embodiments with the water jacket lower portion coolant outlet 219, at least a portion of the coolant that enters the water jacket lower portion 210 may exit through the water jacket lower portion coolant outlet 219. As shown in FIGS. 5 and 6, the water jacket lower portion 210 includes one water jacket lower portion coolant outlet 219. In other embodiments, the water jacket lower portion 210 may include multiple water jacket lower portion coolant outlets 219.

Referring again to FIG. 2, which also depicts a top cross-sectional view of the water jacket lower portion 210, the water jacket lower portion 210 may include a plurality of pads 270 that form a seal between the water jacket lower portion 210 and the cylinder head 120. As shown in FIG. 2, the plurality of pads 270 are positioned throughout the water jacket lower portion 210. In other embodiments, the plurality of pads 270 may be positioned at other locations of the water jacket lower portion 210. The plurality of pads 270 support proper gasket function of an engine system 100 and reduce head lift of the cylinder head 120.

Referring again to FIGS. 6 and 7, the water jacket lower portion 210 includes at least one water jacket lower portion connection 212. Each water jacket lower portion connection 212 is configured to contact and be in coolant providing communication with a corresponding water jacket upper portion connection 252 of the water jacket upper portion 250. As shown in FIGS. 6 and 7, a plurality of water jacket lower portion connections 212 is positioned on the water jacket lower portion 210. The water jacket lower portion connections 212 may be positioned at the exhaust side 201, the intake side 202, and/or in between the exhaust side 201 and the intake side 202.

The water jacket lower portion 210 includes a same number of water jacket lower portion connections 212 as a number of water jacket upper portion connections 252 included by the water jacket upper portion 250. As shown in FIGS. 6 and 7, the water jacket lower portion 210 includes ten water jacket lower portion connections 212. In other embodiments, the water jacket lower portion 210 may include more or fewer water jacket lower portion connections 212.

FIG. 8 depicts a top view of a part of the water jacket lower portion 210, showing the flow of coolant through the water jacket lower portion 210. The water jacket lower portion 210 includes a water jacket lower portion first coolant path 231, a water jacket lower portion second coolant path 233, and a water jacket lower portion third coolant path 235. At least one of the water jacket lower portion first coolant path 231, the water jacket lower portion second coolant path 233, and the water jacket lower portion third coolant path 235 is in coolant receiving communication with at least one of the water jacket lower portion first coolant inlet 215 and the water jacket lower portion second coolant inlet 217. At least one of the water jacket lower portion first coolant path 231, the water jacket lower portion second coolant path 233, and the water jacket lower portion third coolant path 235 is in coolant providing communication with at least one of the water jacket lower portion connections 212. The water jacket lower portion 210 is designed such that the coolant may flow through at least one of the water jacket lower portion first coolant path 231, the water jacket lower portion second coolant path 233, and the water jacket lower portion third coolant path 235 and then into the water jacket upper portion 250 via one of the water jacket lower portion connections 212 and one of the water jacket upper portion connections 252.

As shown in FIG. 8, the water jacket lower portion first coolant path 231 is in coolant receiving communication with one of the water jacket lower portion second coolant inlets 217 and is in coolant providing communication with one of the water jacket lower portion connections 212 that is positioned in the middle of the water jacket lower portion 210. The water jacket upper portion 250 is in coolant receiving communication with the water jacket lower portion first coolant path 231 by the contact of one of the water jacket upper portion connections 252 to the one of the water jacket lower portion connections 212. The water jacket lower portion first coolant path 231 surrounds at least a portion of the exhaust port 129 of the cylinder head 120. As shown in FIG. 8, the water jacket lower portion first coolant path 231 has at least one segment configured to allow the coolant first to flow toward the intake side 202 before flowing back toward the exhaust side 201. As shown in FIG. 8, the water jacket lower portion first coolant path 231 has at least one segment configured to allow the coolant first to flow toward either the fourth side 204 before flowing away from the fourth side 204 or first to flow away from the fourth side 204 before flowing toward the fourth side 204.

As shown in FIG. 8, the water jacket lower portion first coolant path 231 has three curved segments. In other embodiments, the water jacket lower portion first coolant path 231 may have more or fewer curved segments and/or may have straight segments. As shown in FIG. 8, the water jacket lower portion first coolant path 231 changes its curvature or direction twice over the length of the water jacket lower portion first coolant path 231. In other embodiments, the water jacket lower portion first coolant path 231 may change its curvature or direction more or fewer times over the length of the water jacket lower portion first coolant path 231. As shown in FIG. 8, the water jacket lower portion first coolant path 231 has a variable thickness such that the thickness of the water jacket lower portion first coolant path 231 decreases in the direction of the water jacket lower portion first coolant path 231 from the water jacket lower portion second coolant inlet 217 toward the water jacket lower portion connection 212. In other embodiments, the water jacket lower portion first coolant path 231 may have a uniform thickness or may have a different variable thickness.

The water jacket lower portion first coolant path 231 may receive coolant such that the flow of the coolant through the water jacket lower portion first coolant path 231 has a higher velocity as compared to the flow of the coolant through other parts of the water jacket 200. As the exhaust port 129, and other surfaces of components of the engine system 100 that are in the middle of the water jacket lower portion 210, that are contacted by the water jacket lower portion first coolant path 231 are the components of the engine system 100 that can produce the highest temperatures of the cylinder head 120 during operation of the engine system 100, the higher velocity through the water jacket lower portion first coolant path 231 results in observing lower maximum temperatures of the cylinder head 120, as compared to other models.

As shown in FIG. 8, the water jacket lower portion second coolant path 233 is in coolant receiving communication with the water jacket lower portion first coolant path 231 and is in coolant providing communication with the water jacket lower portion third coolant path 235. In other embodiments, the water jacket lower portion second coolant path 233 may be in coolant providing communication with one of the plurality of water jacket lower portion connections 212, instead of or in addition to the water jacket lower portion third coolant path 235, such that at least a portion (including the entire portion) of the coolant flowing through the water jacket lower portion second coolant path 233 is provided to the water jacket upper portion 250. The water jacket lower portion second coolant path 233 is positioned around a portion of the injector bore 155 and is positioned between the first intake port 125 and the second intake port 127 of the cylinder head 120. As shown in FIG. 8, the water jacket lower portion second coolant path 233 has at least one segment configured to allow the coolant to flow toward the intake side 202. As shown in FIG. 8, the water jacket lower portion second coolant path 233 has at least one segment configured to allow the coolant first to flow toward the fourth side 204, then away from the fourth side 204, and then again toward the fourth side 204 or first to flow away from the fourth side 204, then toward the fourth side 204, and then again away from the fourth side 204.

As shown in FIG. 8, the water jacket lower portion second coolant path 233 has two curved segments. In other embodiments, the water jacket lower portion second coolant path 233 may have more or fewer curved segments and/or may have straight segments. As shown in FIG. 8, the water jacket lower portion second coolant path 233 changes its curvature or direction once over the length of the water jacket lower portion second coolant path 233. In other embodiments, the water jacket lower portion second coolant path 233 may change its curvature or direction more or fewer times over the length of the water jacket lower portion second coolant path 233. As shown in FIG. 8, the water jacket lower portion second coolant path 233 has a variable thickness such that the thickness of the water jacket lower portion second coolant path 233 increases in the direction of the water jacket lower portion second coolant path 233 away from the water jacket lower portion first coolant path 231. In other embodiments, the water jacket lower portion second coolant path 233 may have a uniform thickness or may have a different variable thickness.

As shown in FIG. 8, the water jacket lower portion third coolant path 235 is in coolant receiving communication with the water jacket lower portion second coolant path 233 and the water jacket lower portion first coolant inlet 215. In other embodiments, the water jacket lower portion third coolant path may be in coolant receiving communication with only one of the water jacket lower portion second coolant path 233 and the water jacket lower portion first coolant inlet 215. The water jacket lower portion third coolant path 235 is in coolant providing communication with the water jacket lower portion connection 212 that is positioned at the corner of the water jacket lower portion 210 at the exhaust side 201 and the fourth side 204 and with the water jacket lower portion coolant outlet 219. In other embodiments, the water jacket lower portion third coolant path 235 may be in coolant providing communication with only one of the water jacket lower portion connection 212 and the water jacket lower portion coolant outlet 219. The water jacket lower portion third coolant path 235 surrounds at least a portion of the first intake port 125 of the cylinder head 120. As shown in FIG. 8, the water jacket lower portion third coolant path 235 has at least one segment configured to allow the coolant to flow toward the exhaust side 201. As shown in FIG. 8, the water jacket lower portion third coolant path 235 has at least one segment configured to allow the coolant first to flow toward the fourth side 204 before flowing away from the fourth side 204. In other embodiments, the water jacket lower portion third coolant path 235 has at least one segment configured to allow the coolant first to flow away from the fourth side 204 before flowing toward the fourth side 204.

As shown in FIG. 8, the water jacket lower portion third coolant path 235 has two curved segments and a straight segment. In other embodiments, the water jacket lower portion third coolant path 235 may have more or fewer curved segments and/or more or fewer straight segments. As shown in FIG. 8, the water jacket lower portion third coolant path 235 changes its curvature or direction twice over the length of the water jacket lower portion third coolant path 235. In other embodiments, the water jacket lower portion third coolant path 235 may change its curvature or direction more or fewer times over the length of the water jacket lower portion third coolant path 235. As shown in FIG. 8, the water jacket lower portion third coolant path 235 has a variable thickness such that the thickness of the water jacket lower portion third coolant path 235 changes multiple times over the length of the water jacket lower portion third coolant path 235. In other embodiments, the water jacket lower portion third coolant path 235 may have a uniform thickness or may have a different variable thickness.

FIG. 8 also depicts the direction 256 of the flow of the coolant through the first coolant rail 255 and the second coolant rail 257 of the water jacket upper portion 250 that are above the water jacket lower portion 210, depicting this direction 256 as overlaid onto the water jacket lower portion 210 as shown in FIG. 8, from the third side 203 toward the fourth side 204.

Thirty iterations of water jacket flow optimization were performed to determine a maximum temperature of a combustion face of a cylinder head for five other models of cylinder heads with conventional arrangements and for the cylinder head 120. The results of the water jacket flow optimization demonstrate that the cylinder head 120 that is cooled by the water jacket 200 reaches a maximum temperature of 344° C., which is lower than the maximum temperatures observed for the five other models. The lower maximum temperature observed for the cylinder head 120 allows for a reduction in the pump flow of the coolant and to improve the brake thermal efficiency (BTE) of the engine system 100. The results of the water jacket flow optimization also demonstrate that a power of 460 horsepower (HP) is observed for the cylinder head 120, which is the second lowest power observed among the six models compared, and so allows for reduced power demands as compared to four of the other models. The five other models were demonstrated to have combustion face maximum temperatures in a range of 359° C. to 406° C. and power demands in a range of 400 HP to 660 HP.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

The term "coupled" and the like (e.g., "connected"), as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

References herein to the positions of elements (e.g., "top," "bottom," "above,") are merely used to describe the orientation of various elements in the FIGURES. It should be noted that the orientation of various elements may differ according to other example embodiments, and that such variations are intended to be encompassed by the present disclosure.

What is claimed is:

1. A water jacket for a cylinder head of an engine system, the water jacket comprising: a water jacket lower portion comprising a plurality of water jacket lower portion coolant inlets and a plurality of water jacket lower portion coolant paths, the water jacket lower portion in coolant receiving communication with the plurality of water jacket lower portion coolant inlets; and a water jacket upper portion connected to and in coolant receiving communication with the water jacket lower portion, the water jacket upper portion comprising a first coolant rail, a second coolant rail, and a water jacket upper portion coolant outlet; wherein a first one of the plurality of water jacket lower portion coolant paths surround sat least a portion of an exhaust port of the cylinder head and comprises at least one segment configured to allow the coolant first to flow toward an intake side before flowing back toward an exhaust side of the water jacket lower portion, wherein a second one of the plurality of water jacket lower portion coolant paths is positioned between two intake ports of the cylinder head, and wherein the first one of the plurality of water jacket lower portion coolant paths receives coolant from one of the plurality of water jacket lower portion coolant inlets positioned on the exhaust side and provides coolant to a water jacket lower portion connection positioned on the exhaust side, the water jacket lower portion connection being an outlet in fluid providing communication with the water jacket upper portion, and wherein the first one of the plurality of coolant jacket lower portion coolant paths decreases in thickness along a direction of flow from the water jacket lower portion coolant inlet positioned on the exhaust side to the water jacket lower portion connection.

2. The water jacket of claim 1, wherein the water jacket lower portion comprises two water jacket lower portion coolant inlets for each cylinder defined by an engine block connected to the cylinder head.

3. The water jacket of claim 2, wherein a first one of the water jacket lower portion coolant inlets is positioned on an intake side of the water jacket lower portion and a second one of the water jacket lower portion coolant inlets is positioned on an exhaust side of the water jacket lower portion.

4. The water jacket of claim 3, wherein the second one of the plurality of water jacket lower portion coolant paths is in coolant receiving communication with the first one of the plurality of water jacket lower portion coolant paths.

5. The water jacket of claim 1, wherein the first coolant rail is positioned on an intake side of the water jacket upper portion and the second coolant rail is positioned on an exhaust side of the water jacket upper portion.

6. The water jacket of claim 1, wherein a length of each of the first coolant rail and the second coolant rail is the same as a length of the water jacket upper portion.

7. The water jacket of claim 1, wherein the water jacket lower portion comprises a water jacket lower portion coolant outlet.

8. The water jacket of claim 1, wherein the water jacket upper portion is in coolant receiving communication with the first one of the plurality of water jacket lower portion coolant paths.

9. The water jacket of claim 1, wherein the water jacket upper portion comprises at least one water jacket upper portion coolant path connecting the first coolant rail to the second coolant rail.

10. The water jacket of claim 1, wherein the water jacket lower portion comprises a plurality of pads forming a seal between the water jacket lower portion and the cylinder head.

11. The water jacket of claim 1, wherein the water jacket lower portion comprises a water jacket lower portion oil inlet that is in oil receiving communication with an oil supply of the engine system.

12. The water jacket of claim 1, wherein the second one of the plurality of water jacket lower portion coolant paths comprises at least one segment configured to allow the coolant to flow toward an intake side of the water jacket lower portion.

13. The water jacket of claim 1, wherein the water jacket lower portion comprises a third one of the plurality of water jacket lower portion coolant paths, the third one of the plurality of water jacket lower portion coolant paths surrounding at least a portion of a first one of the two intake ports.

14. The water jacket of claim 13, wherein the third one of the plurality of water jacket lower portion coolant paths comprises at least one segment configured to allow the coolant to flow toward an exhaust side of the water jacket lower portion.

15. The water jacket of claim 1, wherein the water jacket upper portion coolant outlet is positioned on an exhaust side of the water jacket upper portion.

16. An engine system, comprising:

an engine block defining at least one cylinder; and a cylinder head connected to the engine block, the cylinder head comprising the water jacket of claim 1.

17. The engine system of claim 16, wherein the cylinder head comprises a plurality of ribs forming a seal between the water jacket lower portion and the cylinder head.

18. The engine system of claim 1, wherein flow through the first one of the plurality of coolant jacket lower portions comprises a higher velocity than flow through the second one of the plurality of water jacket lower portion coolant paths.

19. The engine system of claim 18, wherein the second one of the plurality of water jacket lower portion coolant paths increases in thickness in a direction of flow within the second one of the plurality of water jacket lower portion coolant paths away from the first one of the plurality of water jacket lower portion coolant paths.

* * * * *